United States Patent
Chae et al.

(10) Patent No.: US 9,718,943 B2
(45) Date of Patent: Aug. 1, 2017

(54) COMPOSITION OF PREPARING POLYIMIDE-INORGANIC PARTICLE COMPOSITE, POLYIMIDE-INORGANIC PARTICLE COMPOSITE, AND ARTICLE INCLUDING POLYIMIDE-INORGANIC PARTICLE COMPOSITE

(71) Applicant: SAMSUNG ELECTRONICS CO., Suwon-si, Gyeonggi-do (KR)

(72) Inventors: Jungha Chae, Yongin-si (KR); Woo-Jin Bae, Yongin-si (KR); Byung Hee Sohn, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/716,068

(22) Filed: May 19, 2015

(65) Prior Publication Data

US 2016/0024272 A1    Jan. 28, 2016

(30) Foreign Application Priority Data

Jul. 24, 2014 (KR) .................. 10-2014-0094141

(51) Int. Cl.
| | | |
|---|---|---|
| C08K 3/36 | (2006.01) | |
| C08K 3/34 | (2006.01) | |
| C08G 69/28 | (2006.01) | |
| C08K 3/22 | (2006.01) | |

(52) U.S. Cl.
CPC . C08K 3/36 (2013.01); C08K 3/22 (2013.01)

(58) Field of Classification Search
CPC ............ C08L 79/08; C08K 3/22; C08G 73/10
USPC .................... 524/430, 434, 492; 528/339
See application file for complete search history.

(56) References Cited

U.S. PATENT DOCUMENTS

| | | |
|---|---|---|
| 7,550,194 B2 | 6/2009 | Simone et al. |
| 7,771,521 B2 | 8/2010 | Yamada et al. |
| 2008/0044684 A1* | 2/2008 | Chan .................. B29B 17/0042 428/626 |
| 2009/0226642 A1 | 9/2009 | Simone et al. |
| 2013/0126940 A1* | 5/2013 | Simone .............. C08G 73/1039 257/100 |
| 2014/0243482 A1 | 8/2014 | Park et al. |

FOREIGN PATENT DOCUMENTS

| | | |
|---|---|---|
| EP | 0390119 | * 10/1990 |
| JP | 2000191784 | 7/2000 |
| JP | 3154546 | * 4/2001 |
| JP | 2013014727 | 1/2013 |
| KR | 1020060084742 | 7/2006 |
| KR | 1020070017001 | 2/2007 |
| KR | 1020120113376 | 10/2012 |
| KR | 1020130035691 | 4/2013 |
| WO | 2006025327 | 3/2006 |

\* cited by examiner

*Primary Examiner* — Tae H Yoon
(74) *Attorney, Agent, or Firm* — Cantor Colburn LLP

(57) ABSTRACT

A composition for preparing a polyimide-inorganic particle composite including a reaction product of a tetracarboxylic dianhydride mixture and a diamine, and a precursor of an inorganic particle, wherein the tetracarboxylic dianhydride mixture includes a tetracarboxylic dianhydride represented by Chemical Formula 1, and a tetracarboxylic dianhydride represented by Chemical Formula 2, and wherein the diamine is represented by Chemical Formula 3:

Chemical Formula 1

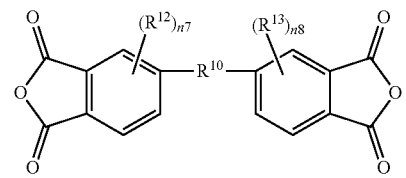

Chemical Formula 2

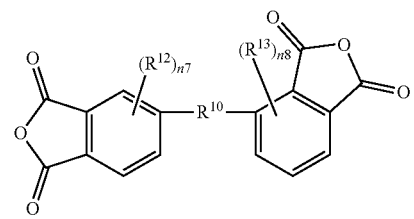

Chemical Formula 3

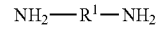

wherein in Chemical Formulae 1 to 3, groups and variable as described in the specification.

7 Claims, 2 Drawing Sheets

COMPOSITION OF PREPARING POLYIMIDE-INORGANIC PARTICLE COMPOSITE, POLYIMIDE-INORGANIC PARTICLE COMPOSITE, AND ARTICLE INCLUDING POLYIMIDE-INORGANIC PARTICLE COMPOSITE

CROSS-REFERENCE TO RELATED APPLICATION

This application claims priority to Korean Patent Application No. 10-2014-0094141, filed on Jul. 24, 2014, and all the benefits accruing therefrom under 35 U.S.C. §119, the content of which is herein incorporated in its entirety by reference.

BACKGROUND

1. Field

This disclosure relates to a composition for preparing a polyimide-inorganic particle composite, a polyimide-inorganic particle composite prepared from the composition, and an article including the polyimide-inorganic particle composite.

2. Description of the Related Art

A polyimide film is a polymer film, which is non-soluble, high- and low-temperature resistant, not oxidative under heat, thermally resistant, resistant to radiation, and thus is applicable in a wide range of applications in heat-resistant high-tech materials utilized in a vehicle, an aerocraft, a spaceship, and the like; electronic materials, such as an insulating coating, an insulating film, a semiconductor, an electrode protecting layer for thin film transistor-liquid crystal display (TFT-LCD), and the like.

Glass has been widely used as a substrate for liquid crystal display, an organic electroluminescent display device, an organic TFT, and the like. However, due to the need for lightness and flexibility, flexible substrates have been explored. High transparency, low thermal expansion, high heat resistance, low optical anisotropy, and the like properties are desired for a flexible substrate to replace glass. Thus, there remains a need in new polymer substrates having high temperature stability and high transparency.

SUMMARY

An embodiment relates to a composition for preparing a polyimide-inorganic particle composite having high temperature stability and high transparency.

Another embodiment relates to a polyimide-inorganic particle composite having high temperature stability and high transparency.

Yet another embodiment relates to an article having high temperature stability and high transparency prepared from the composition or from the composite.

Still another embodiment relates to an optical device including the article.

According to an embodiment, provided is a composition for preparing a polyimide-inorganic particle composite including:

a reaction product of a tetracarboxylic dianhydride mixture and a diamine, and a precursor of an inorganic particle, wherein the tetracarboxylic dianhydride mixture includes a tetracarboxylic dianhydride represented by Chemical Formula 1, and a tetracarboxylic dianhydride represented by Chemical Formula 2:

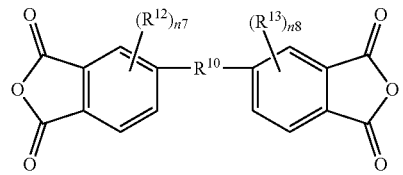

Chemical Formula 1

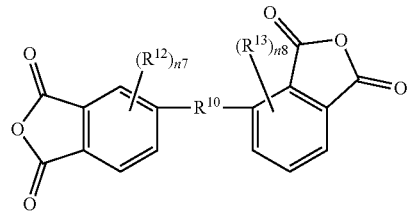

Chemical Formula 2

In Chemical Formulae 1 and 2, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic organic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, an alkoxy group of formula $-OR^{205}$, wherein $R^{205}$ is a substituted or unsubstituted C1 to C10 aliphatic organic group, or a silyl group of formula $-SiR^{209}R^{210}R^{211}$ wherein $R^{209}$, $R^{210}$, and $R^{211}$ are the same or different and are independently a hydrogen or a substituted or unsubstituted C1 to C10 aliphatic organic group, and n7 and n8 are the same or different and are independently an integer ranging from 0 to 3.

The diamine may be represented by Chemical Formula 3:

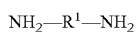    Chemical Formula 3

In Chemical Formula 3, $R^1$ is a substituted or unsubstituted C6 to C30 aromatic organic group, wherein the aromatic organic group may include one aromatic ring, two or more aromatic rings fused together to provide a condensed ring system, or two or more aromatic rings may be linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH.

The reaction product of a tetracarboxylic dianhydride mixture and a diamine may include a polyamic acid or a poly(amic acid-imide) prepared from the tetracarboxylic dianhydride mixture and the diamine.

The inorganic particle may include an oxide or hydroxide of at least one element selected from Ti, Si, Al, Zr, Sn, B, Ce, Sr, Ca, Ba, In, and W.

The precursor of the inorganic particle may be an alkoxide, ester, acetylacetonate, halide, or nitride of at least one element selected from Ti, Si, Al, Zr, Sn, B, Ce, Sr, Ca, Ba, In, and W.

The inorganic particle may be at least one of SiO$_2$, Al$_2$O$_3$, TiO$_2$, ZrO$_2$, ITO (Indium Tin Oxide), or a combination thereof.

The precursor of the inorganic particle may be a precursor of SiO$_2$, TiO$_2$, or a combination thereof.

An amount of the precursor of an inorganic particle may be about 8 percent by weight to about 18 percent by weight based on the weight of the reaction product of a tetracarboxylic dianhydride mixture and a diamine.

An amount of the precursor of an inorganic particle may be about 10 weight % to about 16 weight % based on the weight of the reaction product of a tetracarboxylic dianhydride mixture and a diamine.

The composition may include water.

An amount of water in the composition may be about 10 percent by weight to about 50 percent by weight based on the weight of the precursor of an inorganic particle.

Chemical Formula 1 may be represented by Chemical Formula 4, or Chemical Formula 5, and Chemical Formula 2 may be represented by Chemical Formula 6, or Chemical Formula 7:

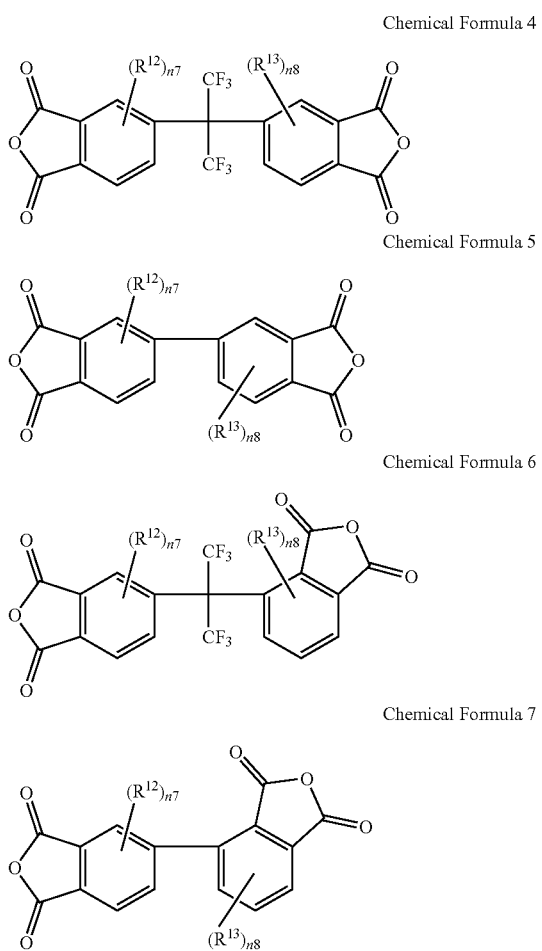

Chemical Formula 4

Chemical Formula 5

Chemical Formula 6

Chemical Formula 7

In Chemical Formulae 4 to 7, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, an alkoxy group of formula —$OR^{200}$, wherein $R^{200}$ is a substituted or unsubstituted C1 to C10 aliphatic organic group, or a silyl group of formula —$SiR^{201}R^{202}R^{203}$ wherein $R^{201}$, $R^{202}$, and $R^{203}$ are the same or different and are independently a hydrogen or a substituted or unsubstituted C1 to C10 aliphatic organic group, and n7 and n8 are the same or different and are independently an integer ranging from 0 to 3.

In the composition, a molar ratio of the dianhydride represented by Chemical Formula 1 and the dianhydride represented by Chemical Formula 2 may be about 1:99 to about 99:1.

An amount of the dianhydride represented by Chemical Formula 2 may be greater than or equal to about 10 mole percent and less than about 53 mole percent, based on the 100 mole percent of the tetracarboxylic dianhydride mixture.

In the composition, an amount of the dianhydride represented by Chemical Formula 2 may be greater than or equal to about 25 mole percent and less than or equal to about 52 mole percent, based on the 100 mole percent of the dianhydride mixture.

In the composition, a mole ratio of the dianhydride mixture and the diamine may be 1:1.

The tetracarboxylic dianhydride represented by Chemical Formula 1 may be 3,3',4,4'-biphenyl tetracarboxylic dianhydride (BPDA).

The tetracarboxylic dianhydride represented by Chemical Formula 2 may be 2,3,3',4'-biphenyltetracarboxylic dianhydride (a-BPDA).

The diamine represented by Chemical Formula 3 may be at least one selected from chemical formulae:

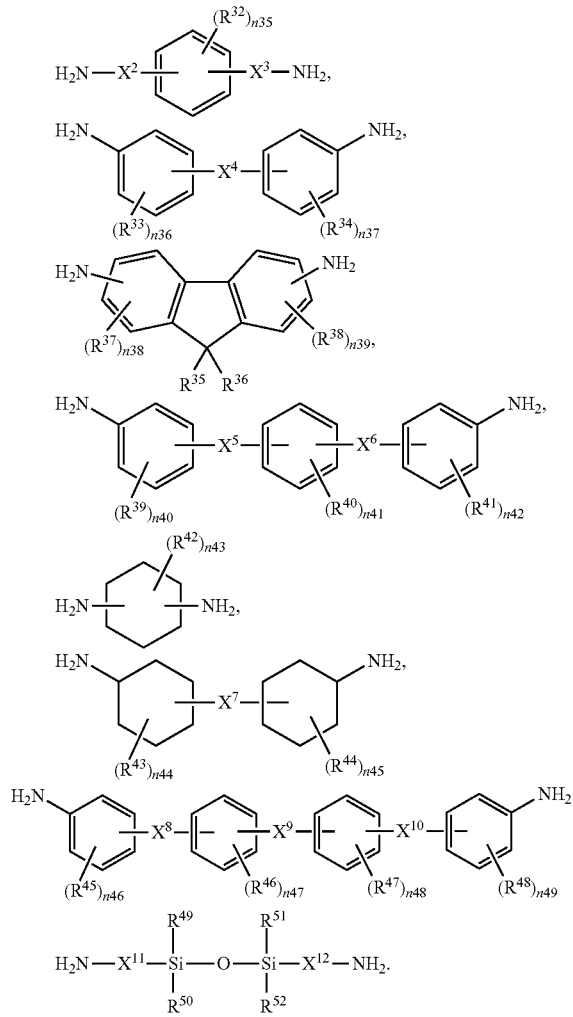

In the chemical formulae, $R^{32}$ and $R^{52}$ are the same or different and are independently a halogen, nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different, and are independently a single bond, a substituted or unsubstituted C1 to C10 alkylene group, a substituted or unsubstituted C1 to C10 cycloalkylene group, a substituted or unsubstituted C6 to C15 arylene group, $SO_2$, O, CO, or a combination thereof, n35 to n37, and n40 to n49 are an integer of 0 to 4, and n38 and n39 are an integer of 0 to 3.

The diamine may be at least one selected from chemical formulae:

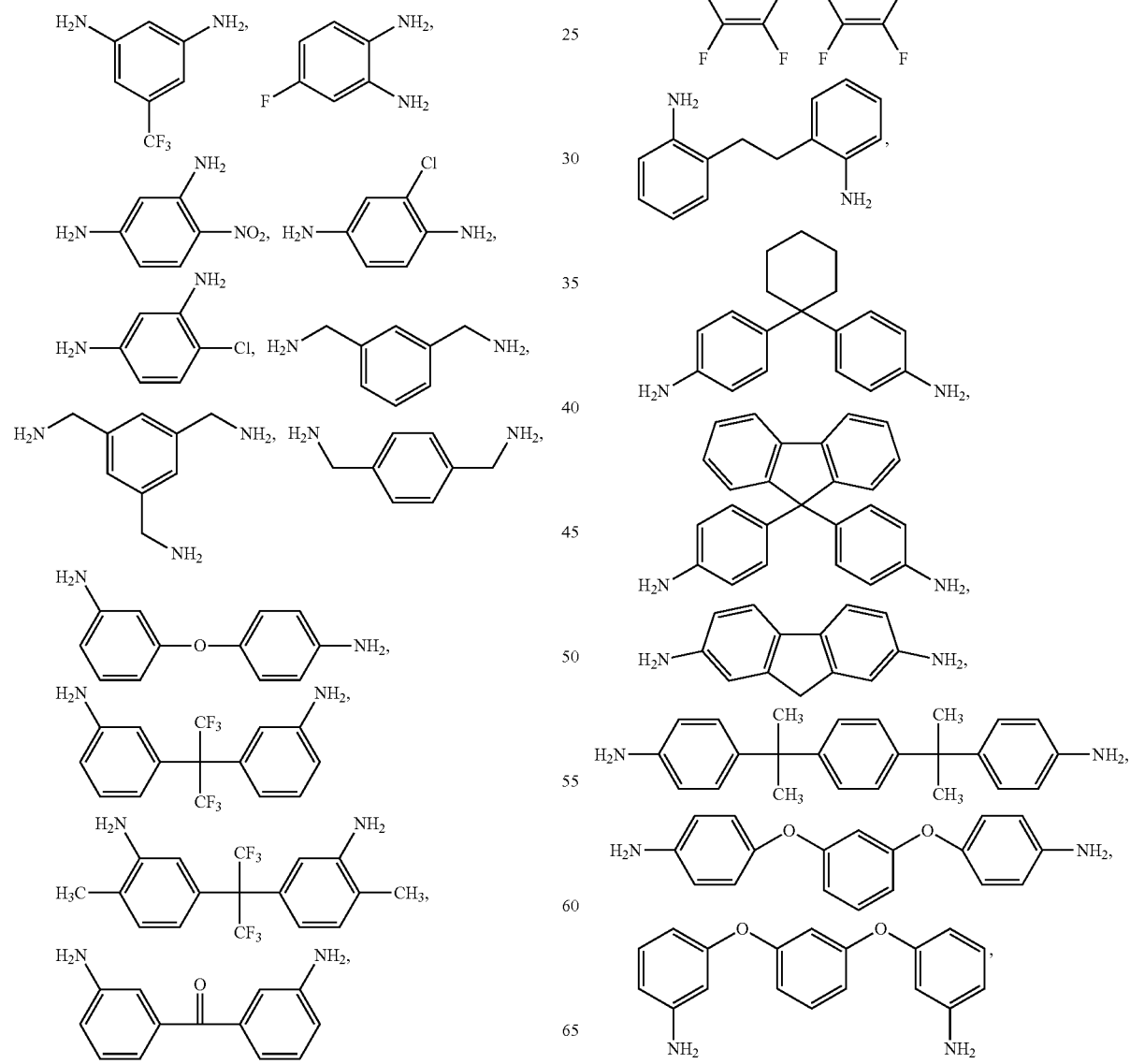

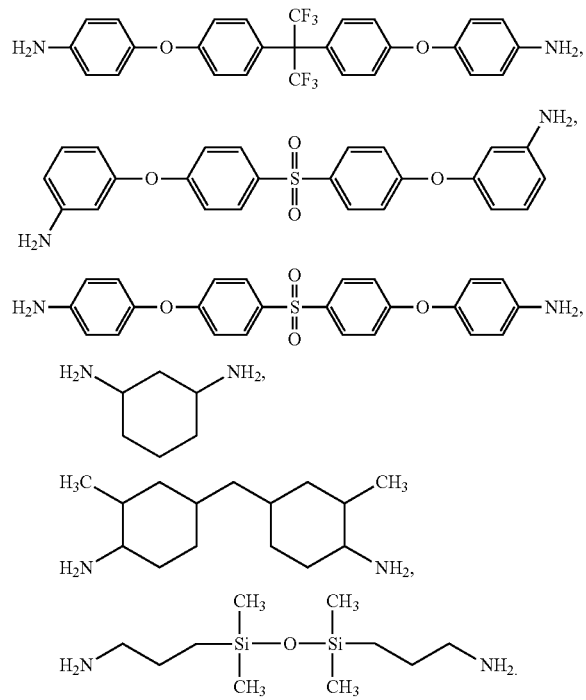

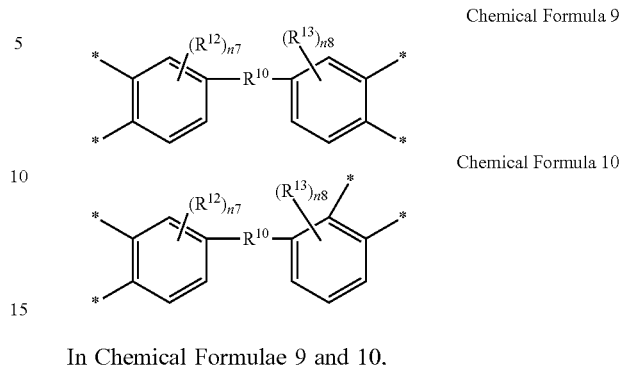

In Chemical Formulae 9 and 10, $R^{10}$, $R^{12}$, $R^{13}$, n7, and n8 are the same as in Chemical Formulae 1 and 2, and

is at least one selected from chemical formulae:

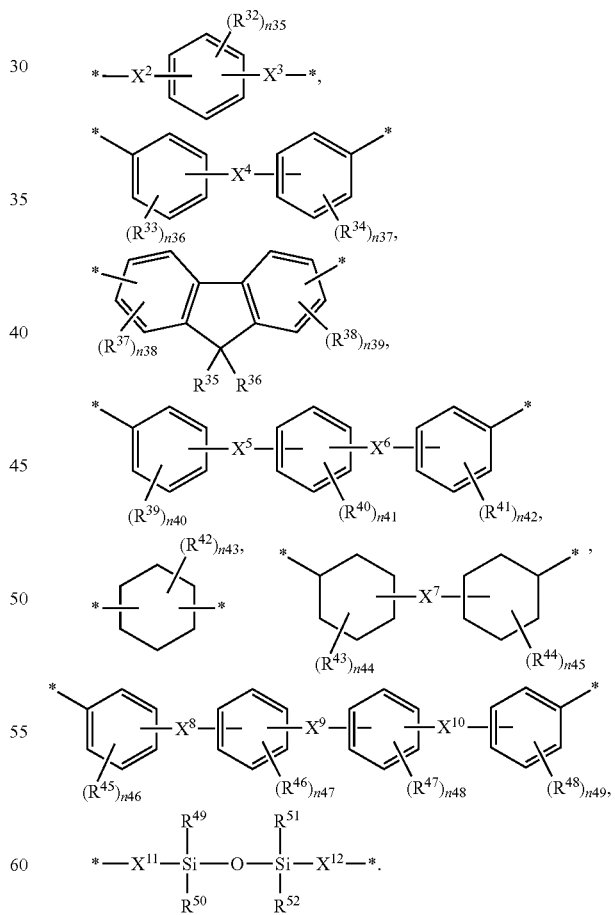

The diamine may be 2,2'-bis(trifluoromethyl)benzidine (TFDB).

According to another embodiment, provided is a polyimide-inorganic particle composite prepared from the composition.

The polyimide-inorganic particle composite may be a composite in which the polyimide and inorganic particle form an Interpenetrating Polymer Network (IPN).

The polyimide may be represented by Chemical Formula 8:

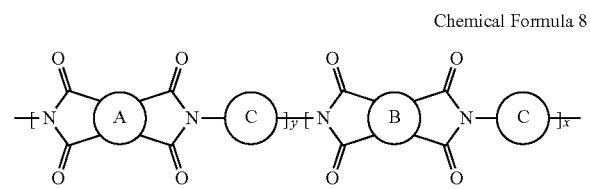

In Chemical Formula 8,

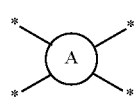

is represented by Chemical Formula 9, and

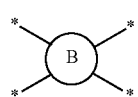

In the chemical formulae, $R^{32}$ to $R^{52}$ are the same or different, and are independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different, and are independently a single bond, a substituted or unsubstituted C1 to C10 alkylene group, a substituted or unsubstituted C1 to C10 cycloalkylene group, a substituted or unsubstituted C6 to C15 arylene group, $SO_2$, O, CO, or a combination thereof, n35 to n37, and n40 to n49 are an integer of 0 to 4, and n38 and n39 are an integer of 0 to 3.

In Chemical Formula 8, each of x and y represents its mole fraction, and $0<x<1$, and $y=1-x$.

x may satisfy $0.10 \leq x < 0.53$, for example, $0.25 \leq x \leq 0.52$.

Chemical Formula 9 may be represented by Chemical Formula 11 or Chemical Formula 12, and Chemical Formula 10 may be represented by Chemical Formula 13 or Chemical Formula 14:

Chemical Formula 11

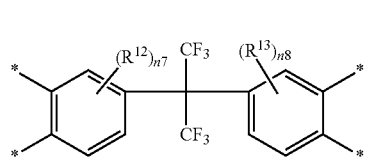

Chemical Formula 12

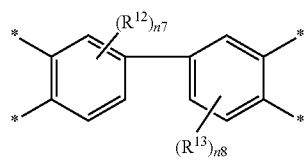

Chemical Formula 13

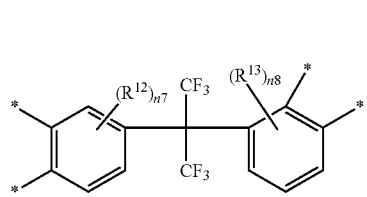

Chemical Formula 14

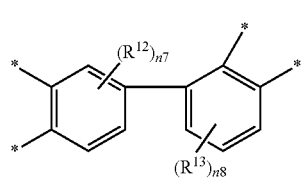

In Chemical Formulae 11 to 14, $R^{12}$, $R^{13}$, n7, and n8 are the same as in Chemical Formulae 1 and 2.

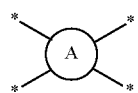

may be represented by Chemical Formula 15:

Chemical Formula 15

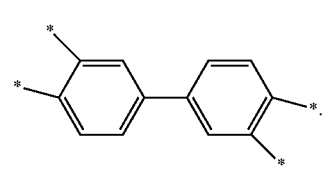

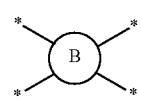

may be represented by Chemical Formula 16:

Chemical Formula 16

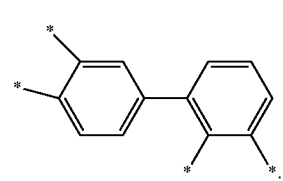

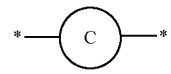

may be represented by Chemical Formula 17:

Chemical Formula 17

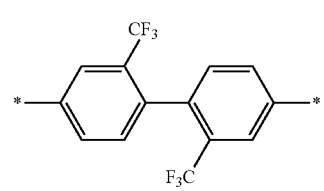

According to yet another embodiment, provided is an article prepared from the composition or from the polyimide-inorganic particle composite.

The article may be a film, a fiber, a coating material, or an adhesive.

The article may have a transmittance for light of greater than or equal to about 80% at a wavelength of 430 nanometers.

The article may have a yellowness index (YI) of less than about 6.

The glass transition temperature of the article may be greater than 350° C.

The weight loss of the article after treatment at 400° C. for 4 hours may be less than or equal to about 0.5 percent.

According to still another embodiment, provided is an optical device including the article.

The optical device may be a liquid crystal display device, an organic light emitting device, or a complementary metal-oxide semiconductor.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
FIG. 1 is a schematic view of a polyimide-inorganic particle composite formed in an interpenetrating polymer network.

This disclosure will be described more fully hereinafter with reference to the accompanying drawings, in which embodiments are shown. This disclosure may, however, be embodied in many different forms and is not to be construed as limited to the exemplary embodiments set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (F, Br, Cl, or I), a hydroxyl group, a nitro group, a cyano group, an amino group ($NH_2$, $NH(R^{100})$ or $N(R^{101})$ ($R^{102}$), wherein $R^{100}$, $R^{101}$, and $R^{102}$ are the same or different, and are each independently a substituted or unsubstituted C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic organic group, in place of at least one hydrogen of a functional group, or the substituents may be linked to each other to provide a ring.

As used herein, when a specific definition is not otherwise provided, the term "alkyl group" refers to a C1 to C30 alkyl group, for example a C1 to C15 alkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, and the term "arylene group" refers to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, and for example through S(=O)$_2$, for example an aryl group or a C6 to C30 arylene group, for example a C6 to C16 aryl group or a C6 to C16 arylene group such as phenylene.

As used herein, when a specific definition is not otherwise provided, the term "heterocyclic organic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, the term "alkyl" indicates a group derived from a completely saturated, branched or unbranched (or a straight or linear) hydrocarbon and having a specified number of carbon atoms.

As used herein, when a definition is not otherwise provided, the term "alkoxy" represents "alkyl-O—", wherein the term "alkyl" has the same meaning as described above.

As used herein, when a definition is not otherwise provided, the term "fluoroalkyl" indicates a group derived from a completely saturated, branched or unbranched (or a straight or linear) hydrocarbon including at least one fluorine atom and having a specified number of carbon atoms.

As used herein, the term "cycloalkyl group" refers to a monovalent group having one or more saturated rings in which all ring members are carbon and having a specified number of carbon atoms.

As used herein, the term "heterocycloalkyl group" refers to a cycloalkyl group as defined above, wherein one or more of the ring carbon atoms are replaced with a heteroatom selected from O, S, N, P, and Si and having a specified number of carbon atoms.

As used herein, the term "cycloalkoxy group" refers to "cycloalkyl-O—", wherein the term "cycloalkyl" has the same meaning as described above.

As used herein, when a definition is not otherwise provided, the term "aryl" group, which is used alone or in combination, indicates an aromatic hydrocarbon containing at least one ring and having a specified number of carbon atoms. The term "aryl" is construed as including a group with an aromatic ring fused to at least one cycloalkyl ring.

As used herein, the term "aryloxy group" refers to "aryl-O—", wherein the term "aryl" has the same meaning as described above.

As used herein, when a definition is not otherwise provided, the term "heteroaryl" group, which is used alone or in combination, refers to an aryl group, wherein one or more carbon atoms is (are) substituted with a heteroatom selected from nitrogen (N), oxygen (O), phosphorus (P), and sulfur (S) and having a specified number of carbon atoms.

As used herein, when a definition is not otherwise provided, the term "alkylene" indicates a divalent group respectively derived from the "alkyl" group.

As used herein, when a definition is not otherwise provided, the term "cycloalkylene" indicates a divalent group respectively derived from the "cycloalkyl" group.

As used herein, when a definition is not otherwise provided, the term "arylene" indicates a divalent group respectively derived from the "aryl" group.

As used herein, when a definition is not otherwise provided, "combination" commonly refers to mixing or copolymerization.

In addition, in the specification, the mark "*" may refer to a point of attachment to another atom or group.

Polyimide film refers to a high-temperature resistant film of polyimide resin, which is prepared by polymerizing an aromatic dianhydride and an aromatic diamine or an aromatic diisocyanate in a solution state to obtain a polyamic acid derivative, and by imidizing the polyamic acid derivative by cyclization and dehydration. However, the polyimide resins have yellow colors due to high aromatic ring content, thus have low transmittance at visible regions and high birefringence, which makes it difficult for the polyimide resins to be used as an optical element. Therefore, a polyimide having a low coefficient of thermal expansion, high heat-resistance, low optical anisotropy, i.e., low out-of-plane retardation ($R_{th}$), and high transmittance for light is still needed.

According to an embodiment, provided is a composition for preparing a polyimide-inorganic particle composite including:

a reaction product of a tetracarboxylic dianhydride mixture and a diamine, and a precursor of an inorganic particle, wherein the tetracarboxylic dianhydride mixture including a tetracarboxylic dianhydride represented by Chemical Formula 1, and a tetracarboxylic dianhydride represented by Chemical Formula 2:

Chemical Formula 1

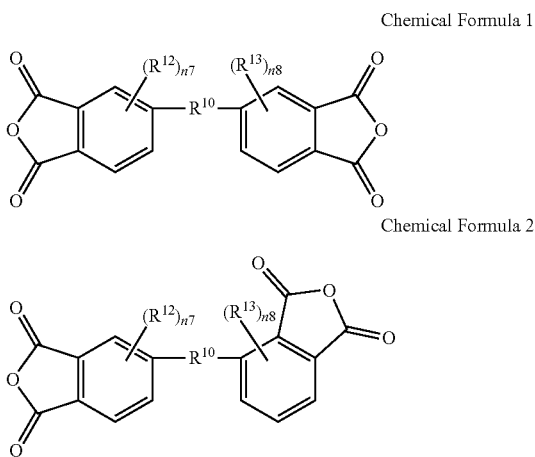

Chemical Formula 2

In Chemical Formulae 1 and 2, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic organic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, an alkoxy group of formula $-OR^{205}$, wherein $R^{205}$ is a substituted or unsubstituted C1 to C10 aliphatic organic group, or a silyl group of formula $-SiR^2R^{210}R^{211}$ wherein $R^{209}$, $R^{210}$, and $R^{211}$ are the same or different and are independently a hydrogen or a substituted or unsubstituted C1 to C10 aliphatic organic group, and n7 and n8 are the same or different and are independently an integer ranging from 0 to 3.

The diamine may be represented by Chemical Formula 3:

$$NH_2-R_1-NH_2. \qquad \text{Chemical Formula 3}$$

In Chemical Formula 3, $R^1$ is a substituted or unsubstituted C6 to C30 aromatic organic group, wherein the aromatic organic group may include one aromatic ring, two or more aromatic rings fused together to provide a condensed ring system, or two or more aromatic rings may be linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH.

The reaction product of a tetracarboxylic dianhydride mixture and a diamine may be a polyamic acid or poly(amic acid-imide) prepared from the tetracarboxylic dianhydride and the diamine.

The inorganic particle may include an oxide or hydroxide of at least one element selected from Ti, Si, Al, Zr, Sn, B, Ce, Sr, Ca, Ba, In, and W.

The precursor of an inorganic particle may be an alkoxide, ester, acetylacetonate, halide, or nitride of at least one element selected from Ti, Si, Al, Zr, Sn, B, Ce, Sr, Ca, Ba, In, and W.

The inorganic particle may be at least one of SiO$_2$, Al$_2$O$_3$, TiO$_2$, ZrO$_2$, or ITO (Indium Tin Oxide). In an exemplary embodiment, the inorganic particle may be SiO$_2$.

The precursor of the inorganic particle may be a precursor of SiO$_2$, TiO$_2$, or a combination thereof.

Polyimide is a high-temperature resistant, not soluble polymer film, which has heat resistant anti-oxidative and heat resistant properties, low temperature resistant properties, solvent resistant properties, etc. Accordingly, a polyimide film is widely used in high tech heat resistant materials for a vehicle, an aerocraft, a spaceship, and the like, and electronic materials for an insulating coating material, an insulating film, a semiconductor, a protection film for TFT-LCD, and the like. However, it is still desired that the properties of the polyimide, such as high heat resistance and high temperature transparency, should further be improved.

For example, a substrate for an organic light-emitting diode (OLED) requires a very high temperature process, compared to processes of fabricating conventional plastic substrates for LCD. High temperatures are usually involved in the process of preparing TFT, which requires ultimate conditions for forming a thin film of the TFT channels. Conventional plastic substrates cannot endure the ultimately high temperature.

In order to maintain uniformity of brightness of panels and main properties of OLED, heating treatment of at least 400° C. is required. Accordingly, a polyimide maintaining high transparency and high thermal stability after treatment at a high temperature for a predetermined period is desired.

An embodiment is related to a composition of preparing a polyimide-inorganic particle composite in which a certain amount of an inorganic particle are introduced into polyimide. Such composition allows to prepare a polyimide-inorganic composite having high temperature stability and high transparency. Therefore, by using the composition, an element for an electronic device withstanding a high temperature process may be fabricated. For example, the electronic device may be an OLED, and the composite prepared from the composition according to an embodiment may be used as a transparent substrate for an OLED.

In the composition for preparing a polyimide-inorganic particle composite, the precursor of an inorganic particle is added to the polyamic acid or poly(amic acid-imide) to form a sol-gel to form a polyimide-inorganic particle composite with the polyimide prepared from imidization of the polyamic acid or poly(amic acid-imide). Accordingly, the precursor of an inorganic particle may be any precursor that can be added to the polyamic acid or poly(amic acid-imide) to convert to an inorganic particle as the polyamic acid or poly(amic acid-imide) convert to polyimide.

For example, the precursor of the inorganic particle may be a precursor of SiO$_2$, TiO$_2$, or a combination thereof, but is not limited thereto.

For example, the precursor of TiO$_2$ may be titanium tetraisopropoxide.

For example, the precursor of SiO$_2$ may be TEOS (tetraethyl orthosilicate), TMOS (tetramethyl orthosilicate), or a compound represented by any one of Chemical Formulae 18 to 20:

Chemical Formula 18

In Chemical Formula 18, $R^b$ and $R^c$ are the same or different, and are independently hydrogen, C1 to C20 alkyl group, C2 to C20 alkenyl group, C2 to C20 alkynyl group, C3 to C20 cycloalkyl group, or C6 to C18 aryl group, n is and integer ranging from 1 to 4.

Chemical Formula 19

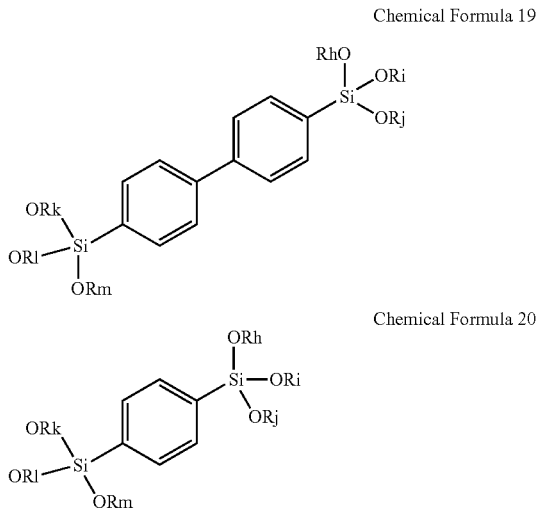

Chemical Formula 20

In Chemical Formulae 19 and 20, $R_h$ to $R_m$ are the same or different, and are independently a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, or a substituted or unsubstituted C6 to C18 aryl group.

Meanwhile, in order for the sol-gel reaction to occur, the composition may further include water.

The precursor of an inorganic particle may be contained in an amount of about 8 percent by weight (weight %) to about 18 weight % based on the weight of the reaction product of the tetracarboxylic dianhydride and the diamine. For example, the precursor of an inorganic particle may be contained in an amount of about 10 weight % to about 16 weight % based on the weight of the reaction product of the tetracarboxylic dianhydride and the diamine. If the precursor of an inorganic particle is contained in an amount of less than 8 weight %, the effect of adding an inorganic particle to polyimide to prepare a polyimide-inorganic particle composite having high temperature stability and high transparency may be insignificant. If the precursor of an inorganic particle is contained in an amount of greater than 18 weight %, the composite prepared therefrom may be brittle.

Water may be contained in an amount of about 10 weight % to about 50 weight % based on the weight of the precursor of an inorganic particle.

Chemical Formula 1 may be represented by Chemical Formula 4, or Chemical Formula 5, and Chemical Formula 2 may be represented by Chemical Formula 6 or Chemical Formula 7:

Chemical Formula 4

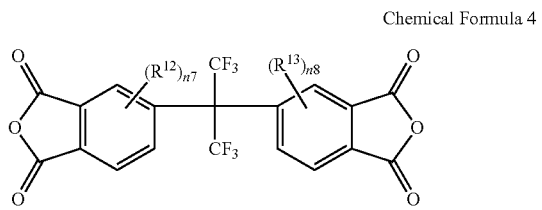

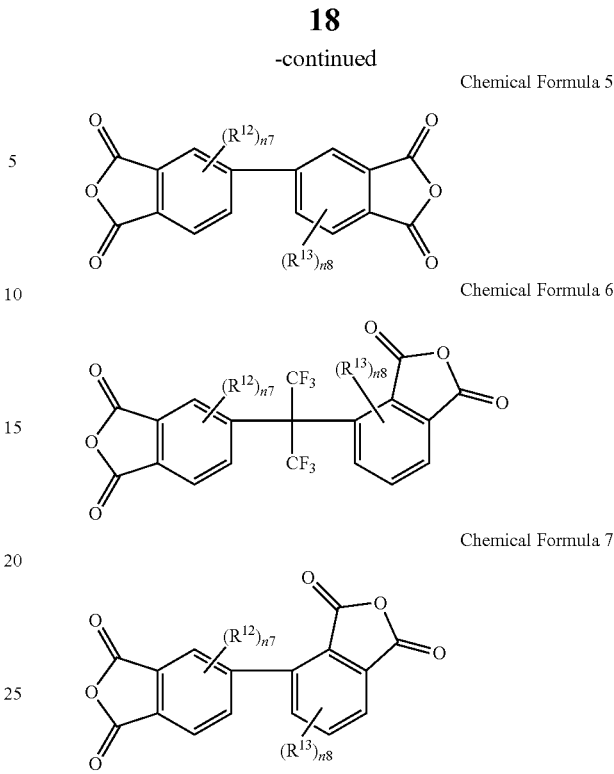

In Chemical Formulae 4 to 7, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, an alkoxy group of formula —$OR^{200}$, wherein $R^{200}$ is a substituted or unsubstituted C1 to C10 aliphatic organic group, or a silyl group of formula —$SiR^{201}R^{202}R^{203}$ wherein $R^{201}$, $R^{202}$, and $R^{203}$ are the same or different and are independently a hydrogen or a substituted or unsubstituted C1 to C10 aliphatic organic group, and n7 and n8 are the same or different and are independently an integer ranging from 0 to 3.

The composition according to an embodiment includes a dianhydride having a planar structure represented by Chemical Formula 1, as well as a dianhydride having a titled dihedral structure represented by Chemical Formula 2. While not wishing to be bound to a theory, it is understood that the polyimide prepared from the composition has difficulty in forming a chain alignment among the polymer chains. Such a polyimide has difficulty in forming a Charge Transfer Complex among chains, which is believed to render the polyimide to have a low yellowness index and high transparency, as shown in the following Examples.

In addition, the composition further includes a precursor of an inorganic particle. Thus the polyimide-inorganic particle composite may have excellent properties, such as a high transmittance for light and a low yellowness index, as well as a higher heat-resistance due to the stability of the inorganic particle at a high temperature.

Accordingly, the polyimide-inorganic particle composite may have a high glass transition temperature (Tg) and a high transmittance for light after treatment at a temperature of 400° C.

The tetracarboxylic dianhydride represented by Chemical Formula 1 may include any anhydride having a planar structure of Chemical Formula 1, and may be, for example, at least one selected from 3,3',4,4'-biphenyl tetracarboxylic dianhydride (BPDA), 3,3',4,4'-diphenylsulfone tetracarboxylic dianhydride (DSDA), 4,4'-oxydiphthalic anhydride (ODPA), 4,4'-(hexafluoroisopropylidene)diphthalic anhydride (6FDA), pyromellitic dianhydride (PMDA), or a combination thereof.

The tetracarboxylic dianhydride represented by Chemical Formula 2 may include any anhydride having a tilted dihedral structure of Chemical Formula 2, and may be, for example, at least one selected from 2,3,3',4'-biphenyltetracarboxylic dianhydride (a-BPDA), 2,3,3',4',-diphenylsulfone tetracarboxylic dianhydride, 3,4'-oxydiphthalic anhydride, or a combination thereof.

In an example embodiment, the tetracarboxylic dianhydride represented by Chemical Formula 1 may include 3,3',4,4'-biphenyl tetracarboxylic dianhydride (BPDA), and the tetracarboxylic dianhydride represented by Chemical Formula 2 may include 2,3,3',4'-biphenyl tetracarboxylic dianhydride (a-BPDA).

In the composition, the dianhydride represented by Chemical Formula 1 and the dianhydride represented by Chemical Formula 2 may be included in a mole ratio of 1:99 to 99:1.

In an example embodiment, the dianhydride represented by Chemical Formula 2 may be included in an amount of greater than or equal to about 10 mole percent (mole %) and less than about 53 mole %, for example, greater than or equal to about 25 mole % and less than or equal to about 52 mole %, based on 100 mole percent numbers of the dianhydride mixture.

Within the above ranges, an article prepared from the composition may have good optical properties, such as, for example, high transmittance for light, low yellowness index, and the like, as well as good thermal properties, such as, for example, high glass transition temperature, high degradation temperature, and the like.

The diamine may be any diamine that can react with the dianhydride to prepare an imide, and may include a diamine represented by Chemical Formula 3:

NH$_2$—R$^1$—NH$_2$  Chemical Formula 3

In Chemical Formula 3,

R$^1$ is a substituted or unsubstituted C6 to C30 aromatic organic group, wherein the aromatic organic group may include one aromatic ring, two or more aromatic rings fused together to provide a condensed ring system, or two or more aromatic rings may be linked through a single bond or through a functional group selected from a fluorenylene group, O, S, C(=O), CH(OH), S(=O)$_2$, Si(CH$_3$)$_2$, (CH$_2$)$_p$ wherein 1≤p 10, (CF$_2$)$_q$ wherein 1 q 10, C(CH$_3$)$_2$, C(CF$_3$)$_2$, and C(=O)NH.

The diamine represented by Chemical Formula 3 may be at least one selected from the following chemical formulae:

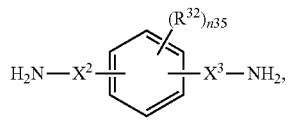

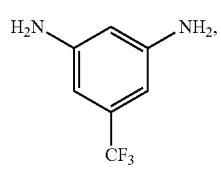 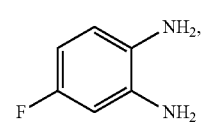 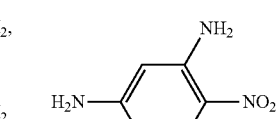

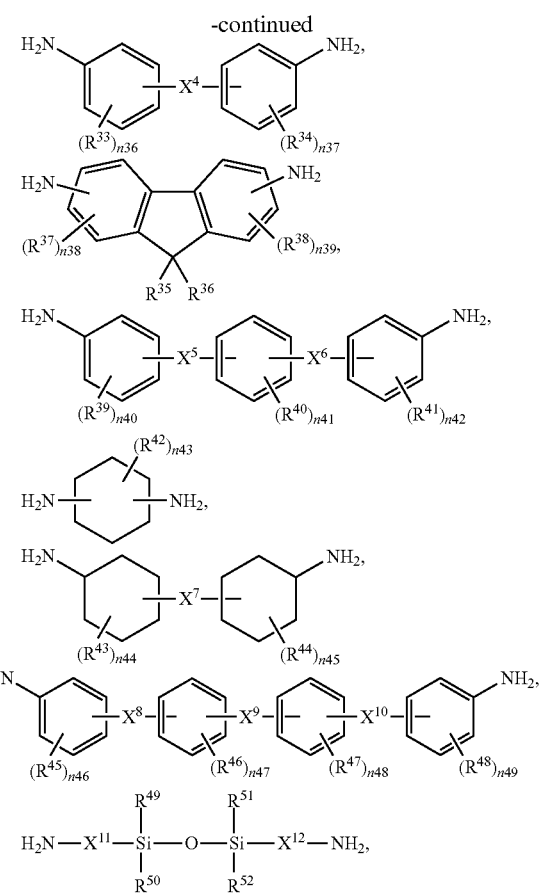

In the above chemical formulae,

R$^{32}$ to R$^{52}$ are the same or different, and are independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, or a substituted or unsubstituted C2 to C15 heteroaryl group, X$^2$ to X$^{12}$ are the same or different, and are independently a single bond, a substituted or unsubstituted C1 to C10 alkylene group, a substituted or unsubstituted C1 to C10 cycloalkylene group, a substituted or unsubstituted C6 to C15 arylene group, SO$_2$, O, CO, or a combination thereof, n35 to n37, and n40 to n49 are an integer of 0 to 4, and n38 and n39 are an integer of 0 to 3.

The diamine may be at least one selected from the following chemical formulae:

-continued
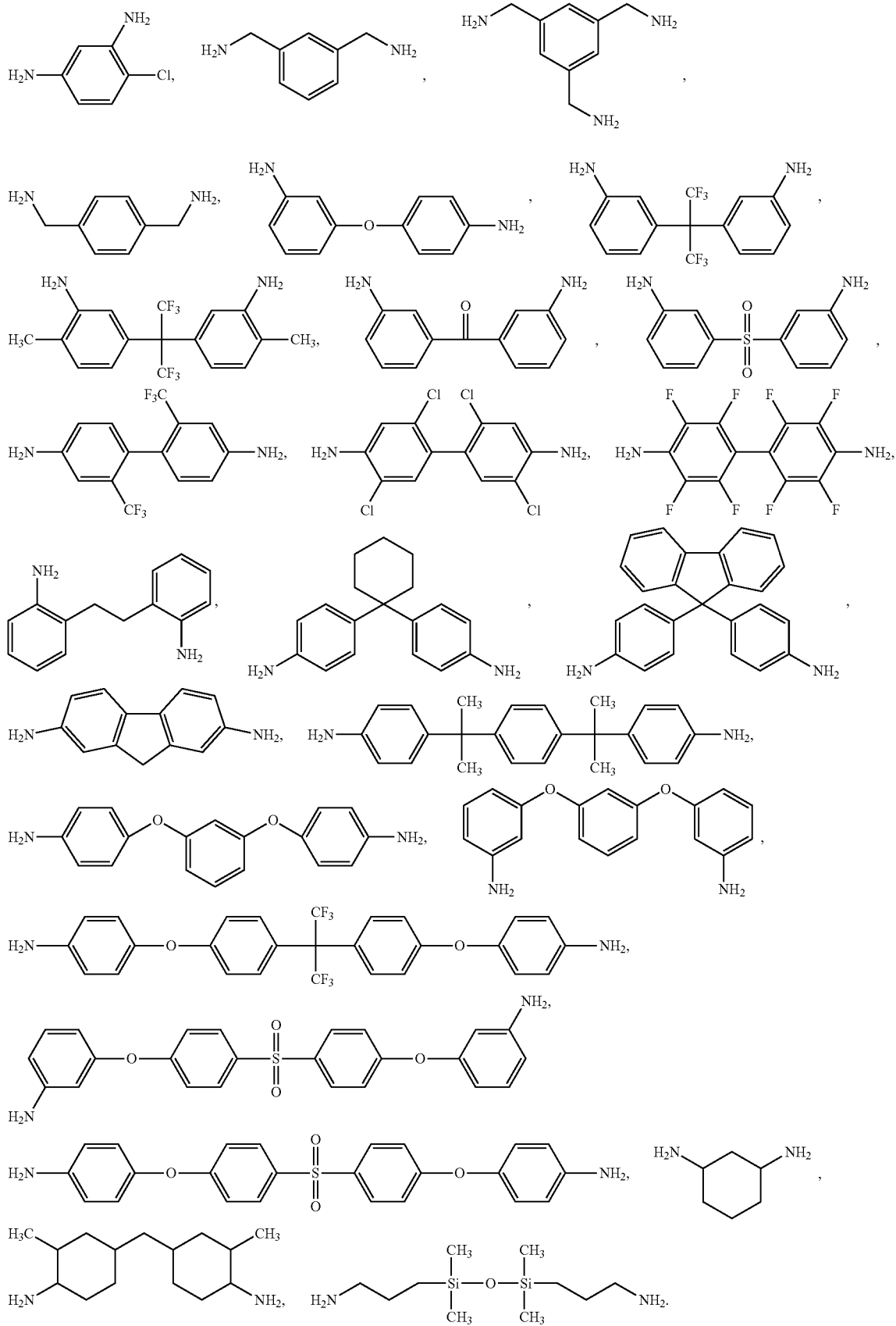

In an example embodiment, the diamine may be 2,2'-bis(trifluoromethyl)benzidine (TFDB).

In the composition according to an embodiment, the dianhydride and the diamine may react at a mole ratio of 1:1 to form a polyimide, and a precursor of an inorganic particle may be added thereto, to form a polyimide-inorganic particle composite by imidizing the resulting solution.

According to another embodiment, provided is a polyimide-inorganic particle composite prepared from the composition.

The polyimide-inorganic particle composite may be a composite in which an interpenetrating polymer network (IPN) is formed by the polyimide and the inorganic particle.

FIG. 1 is a schematic view of a polyimide-inorganic particle composite formed in an interpenetrating polymer network. As shown in FIG. 1, the polyimide-inorganic particle composite is believed to form an interpenetrating polymer network, in which the polyimide chains 1 and inorganic particles 2 are homogeneously distributed and penetrate each other.

That is, the polyamic acid or the poly(amic acid-imide) and the precursor of the inorganic particles are homogeneously distributed in the composition by adding the precursor of the inorganic particle into the polyamic acid or poly(amic acid-imide) solution, agitating the same. The precursor of the inorganic particle may be hydrolyzed to form a sol-gel, and convert to the inorganic particles as they are homogeneously distributed among the polyamic acid or poly(amic acid-imide). In this arrangement, if the composition is casted on a substrate and imidized, the polyimide-inorganic particle composite prepared may also be in a form of an IPN. The composite in a form of an IPN has improved properties, as the inorganic particles are homogeneously distributed among the polyimide.

The polyimide in the polyimide-inorganic particle composite may be represented by Chemical Formula 8:

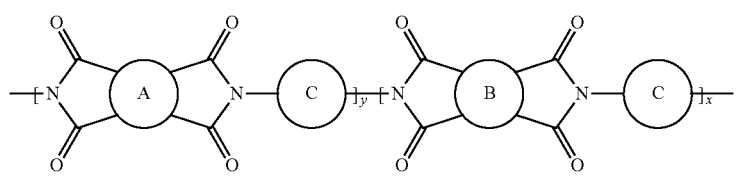

Chemical Formula 8

In Chemical Formula 8,

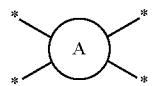

may be represented by Chemical Formula 9,

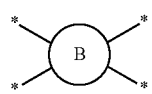

may be represented by Chemical Formula 10:

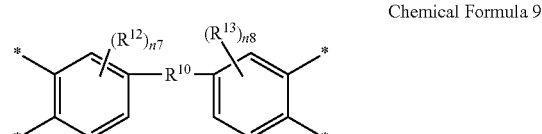

Chemical Formula 9

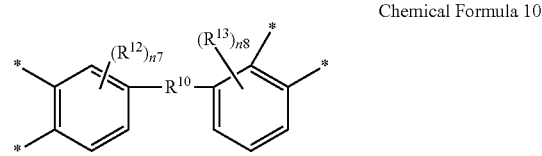

Chemical Formula 10

In Chemical Formulae 9 and 10, $R^{10}$, $R^{12}$, $R^{13}$, n7 and n8 are the same as in Chemical Formulae 1 and 2), and

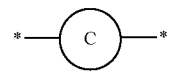

may be at least one selected from the following chemical formulae:

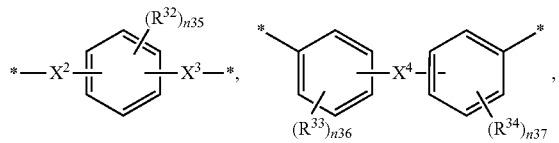

-continued

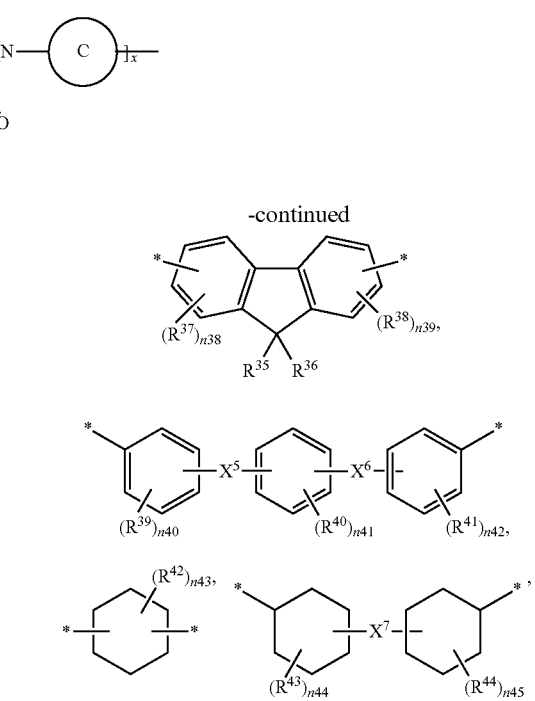

-continued

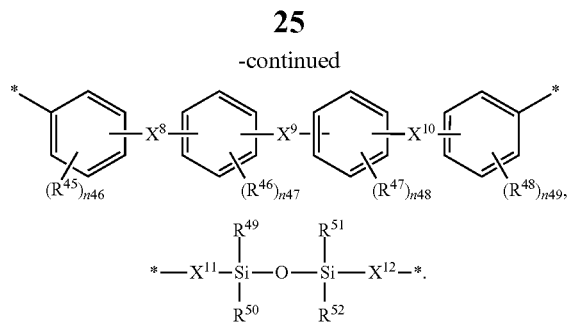

In the above chemical formulae, $R^{32}$ to $R^{52}$ are the same or different, and are independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different, and are independently a single bond, a substituted or unsubstituted C1 to C10 alkylene group, a substituted or unsubstituted C1 to C10 cycloalkylene group, a substituted or unsubstituted C6 to C15 arylene group, $SO_2$, O, CO, or a combination thereof, n35 to n37, and n40 to n49 are an integer of 0 to 4, and n38 and n39 are an integer of 0 to 3.

In Chemical Formula 8, x and y indicate the mole fractions of each corresponding structure unit in the polymer, and x is 0<x<1, and y=1−x.

In an example embodiment, x may satisfy 0.10≤x≤0.53, for example, 0.25≤x≤0.52.

Chemical Formula 9 may be represented by Chemical Formula 11 or Chemical Formula 12, and Chemical Formula 10 may be represented by Chemical Formula 13 or Chemical Formula 14:

Chemical Formula 11

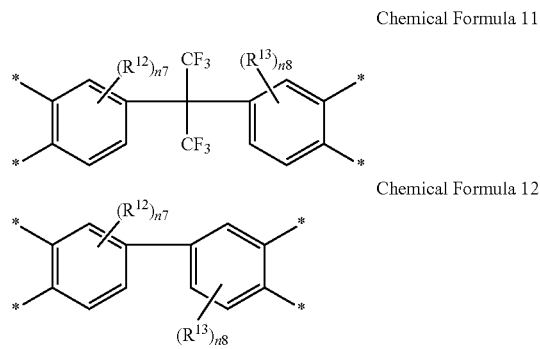

Chemical Formula 12

Chemical Formula 13

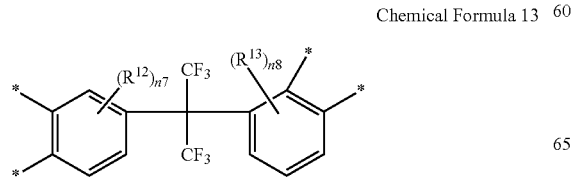

Chemical Formula 14

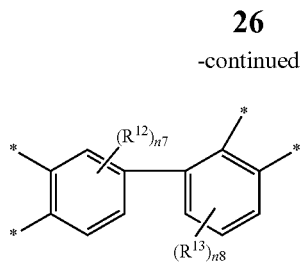

In Chemical Formulae 11 to 14, $R^{12}$, $R^{13}$, n7 and n8 are the same as in Chemical Formulae 1 and 2.

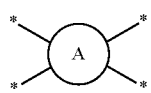

may be represented by Chemical Formula 15:

Chemical Formula 15

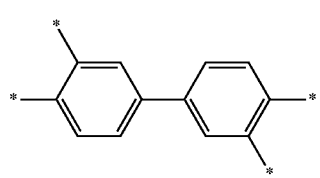

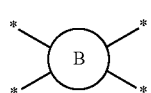

may be represented by Chemical Formula 16:

Chemical Formula 16

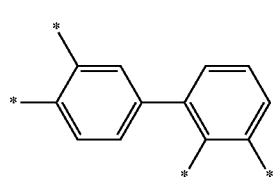

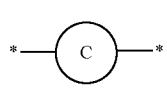

may be represented by Chemical Formula 17:

Chemical Formula 17

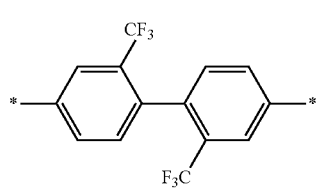

According to yet another embodiment, provided is an article prepared from the composition or from the polyimide.

The article may be a film, a fiber, a coating material, or an adhesive.

The article may have a light transmittance for light of greater than about 88% at a wavelength range of from 380 nanometers to 780 nanometers for a film of 10 cm thickness, and have a light transmittance for light of greater than about 80% at a wavelength of 430 nanometers after treatment at a temperature of 400° C. for 30 minutes. That is, the article may maintain good transmittance for light after being treated at a high temperature, and thus may be used in an application requiring a high temperature process, such as, for example, an optical device, for example, for a substrate of OLED.

The article may have a yellowness index (YI) of less than about 6, for example, less than about 5.7.

The article may have a high glass transition temperature, for example, of greater than or equal to about 350° C., for example, of greater than or equal to about 360° C., and for example, of greater than or equal to about 370° C.

The article may have equal to or less than 0.5% of weight degradation after being treated at a temperature of 400° C., for 4 hours.

The article prepared from the composition or from the composite prepared from the composition according to an embodiment, such as, for example, a film, may have a high transmittance for light and high thermal stability, as described above, and thus may be advantageously used in an optical device requiring a high temperature process, such as, for example, an OLED. Therefore, in an exemplary embodiment, the article may be an optical film.

According to another embodiment, provided is an optical device including the article.

The optical device may be a liquid crystal display device ("LCD"), an organic light emitting diode ("OLED"), a complementary metal-oxide semiconductor ("CMOS"), and the like, but is not limited thereto.

Figure 2:
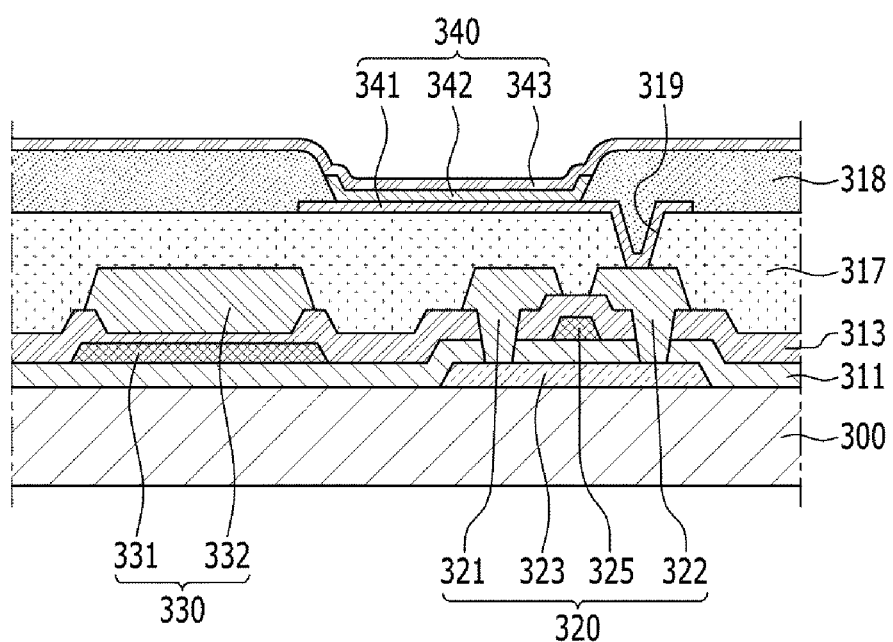
FIG. 2 is a cross-sectional view of an organic light emitting diode (OLED) in accordance with an embodiment.

Among the display devices, an organic light emitting diode (OLED) is described by referring to FIG. 2. FIG. 2 is a cross-sectional view of an organic light emitting diode (OLED) in accordance with an embodiment.

Referring to FIG. 2, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and they face each other with the gate electrode 325 disposed between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be formed into an article including the composite including the poly(amide-imide) copolymer and inorganic particles.

Hereafter, the embodiments of this disclosure are described in detail with reference to examples. The following examples and comparative examples are not restrictive but are illustrative.

EXAMPLES

Examples 1-4: Preparation of Polyimide-Silica Composite Films

Example 1

80.73 milliliters (ml) of N-methyl-2-pyrrolidone (NMP) is fed into a 250 mL round-bottomed flask equipped with an agitator, an inlet for $N_2$ gas, and a cooler, under $N_2$ atmosphere. After the reactor temperature settles at 25° C., 8.85 grams (g) (0.0208 mole) of 2,2'-bis(trifluoromethyl)benzidine (TFDB) is added, while maintaining the temperature at 25° C. To the solution, 6.1 g (0.0235 mole) of BPDA, and 2.03 g (0.0069 mole) of a-BPDA are added, and the resulting mixture is agitated for 48 hours to obtain a polyamic acid solution (solid content of 17 weight %). To the polyamic acid solution, 10 ml of TEOS (tetraethylorthosilicate), which corresponds to 13.7 weight % of the solid content of the polyamic acid, 3 ml of water, and 7.5 ml of NMP are added, and the resulting mixture is agitated for 24 hours to prepare silica sol.

Upon completion of the reaction, the resulting solution is coated on a glass substrate and spin casted, dried on a hot plate of 100° C. for 20 minutes, introduced into a furnace, for heat treatment from room temperature to 300° C. for 30 minutes, and maintained at 300° C. for 1 hour. The coated layer is further heated to 400° C. for 10 minutes and maintained at 400° C. for 30 minutes, slowly cooled and separated from the glass substrate to obtain a polyimide-silica composite film (10 μm thickness).

Example 2

80.7 ml of N-methyl-2-pyrrolidone (NMP) is fed into a 250 mL round-bottomed flask equipped with an agitator, an inlet for $N_2$ gas, and a cooler, under $N_2$ atmosphere. After the temperature of the reactor settles at 25° C., 8.85 g (0.0277 mole) of 2,2'-bis(trifluoromethyl)benzidine (TFDB) is added, while maintaining the temperature at 25° C. To the solution, 5.69 g (0.0194 mole) of BPDA, and 2.44 g (0.0083 mole) of a-BPDA are added, and the reaction mixture is agitated for 48 hours to obtain a polyamic acid solution (solid content of 17 weight %). To the polyamic acid solution, 10 ml of TEOS (tetraethylorthosilicate), which corresponds to 13.7 weight % of the solid content of the polyamic acid, 3 ml of water, and 7.5 ml of NMP are added and the resulting mixture is agitated for 24 hours to prepare silica sol.

Upon completion of the reaction, the resulting solution is coated on a glass substrate and spin casted, dried on a hot plate of 100° C. for 20 minutes, introduced into a furnace for heat treatment from the room temperature to 300° C. for 30 minutes, and maintained at 300° C. for 1 hour. The coated layer is further heated to 400° C. for 10 minutes and maintained at 400° C. for 30 minutes, slowly cooled and separated from the glass substrate to obtain a polyimide-silica composite film (10 μm thickness).

Example 3

80.79 ml of N-methyl-2-pyrrolidone (NMP) is fed into a 250 mL round-bottomed flask equipped with an agitator, an inlet for $N_2$ gas, and a cooler, under $N_2$ atmosphere. After the temperature of the reactor settles at 25 C, 8.85 g (0.0277 mole) of 2,2'-bis(trifluoromethyl)benzidine (TFDB) is added, while maintaining the temperature at 25° C. To the solution, 5.29 g (0.018 mole) of BPDA, and 2.84 g (0.0097 mole) of a-BPDA are added, and the resulting mixture is agitated for 48 hours to obtain a polyamic acid solution (solid content of 17 weight %). To the polyamic acid solution, 10 ml of TEOS (tetraethylorthosilicate), which corresponds to 13.7 weight % of the solid content of the polyamic acid, 3 ml of water, and 7.5 ml of NMP are added and the resulting mixture agitated for 24 hours to prepare silica sol.

Upon completion of the reaction, the resulting solution is coated on a glass substrate and spin casted, dried on a hot plate of 100° C. for 20 minutes, introduced into a furnace for heat treatment from the room temperature to 300° C. for 30 minutes and maintained at 300° C. for 1 hour. The coated layer is further heated to 400° C. for 10 minutes and maintained at 400° C. for 30 minutes, and slowly cooled and separated from the glass substrate to obtain a polyimide-silica composite film (10 μm thickness).

Example 4

80.79 ml of N-methyl-2-pyrrolidone (NMP) is fed into a 250 mL round-bottomed flask equipped with an agitator, an inlet for $N_2$ gas, and a cooler, under $N_2$ atmosphere. After the temperature of the reactor settles at 25° C., 8.85 g (0.0277 mole) of 2,2'-bis(trifluoromethyl)benzidine (TFDB) is added, while maintaining the temperature at 25° C. To the solution, 4.88 g (0.0166 mole) of BPDA, and 3.25 g (0.0111 mole) of a-BPDA are added, and the resulting mixture is agitated for 48 hours to obtain a polyamic acid solution (solid content of 17 weight %). To the polyamic acid solution, 10 ml of TEOS (tetraethylorthosilicate), which corresponds to 13.7 weight % of the solid content of the polyamic acid, 3 ml of water, and 7.5 ml of NMP are added and the resulting mixture is agitated for 24 hours to prepare silica sol.

Upon completion of the reaction, the resulting solution is coated on a glass substrate and spin casted, dried on a hot plate of 100° C. for 20 minutes, introduced into a furnace for heat treatment from the room temperature to 300° C. for 30 minutes and maintained at 300° C. for 1 hour. The coated layers further heated to 400° C. for 10 minutes, maintained at 400° C. for 30 minutes, and slowly cooled and separated from the glass substrate to obtain a polyimide-silica composite film (10 am thickness).

Comparative Examples 1-5: Preparation of Polyimide Films

Comparative Example 1

80.79 ml of N-methyl-2-pyrrolidone (NMP) is fed into a 250 mL round-bottomed flask equipped with an agitator, an inlet for $N_2$ gas, and a cooler under $N_2$ atmosphere. After the temperature of the reactor settles at 25° C., 8.85 g (0.0277 mole) of 2,2'-bis(trifluoromethyl)benzidine (TFDB) is added, while maintaining the temperature at 25° C. To the solution, 6.1 g (0.0208 mole) of BPDA, and 2.03 g (0.0069 mole) of a-BPDA are added, and the resulting mixture is agitated for 48 hours to obtain a polyamic acid solution (solid content of 17 weight %).

Upon completion of the reaction, the resulting solution is coated on a glass substrate and spin casted, dried on a hot plate of 100° C. for 20 minutes, introduced into a furnace for heat treatment from the room temperature to 300° C. for 30 minutes, and maintained at 300° C. for 1 hour The coated layer further heated to 400° C. for 10 minutes, maintained at 400° C. for 30 minutes, and slowly cooled and separated from the glass substrate to obtain a polyimide film (10 an thickness).

Comparative Example 2

72.9 ml of N-methyl-2-pyrrolidone (NMP) is fed into a 250 mL round-bottomed flask equipped with an agitator, an inlet for $N_2$ gas, and a cooler, under $N_2$ atmosphere. After the temperature of the reactor settles at 25° C., 13.41 g (0.0419 mole) of 2,2'-bis(trifluoromethyl)benzidine (TFDB) is added, while maintaining the temperature at 25° C. To the solution, 9.24 g (0.0314 mole) of BPDA, and 2.34 g (0.0105 mole) of HPMDA are added, and the resulting mixture is agitated for 48 hours to obtain a polyamic acid solution (solid content of 25 weight %).

Upon completion of the reaction, the resulting solution is coated on a glass substrate and spin casted, dried on a hot plate of 100° C. for 20 minutes, introduced into a furnace for heat treatment from the room temperature to 300° C. for 30 minutes and maintained at 300° C. for 1 hour. The coated layer is further heated to 400° C. for 10 minutes, maintained at 400° C. for 30 minutes, and slowly cooled and separated from the glass substrate to obtain a polyimide film (10 μm thickness).

Comparative Example 3

80.73 ml of N-methyl-2-pyrrolidone (NMP) is fed into a 250 mL round-bottomed flask equipped with an agitator, an inlet for $N_2$ gas, and a cooler, under $N_2$ atmosphere. Then, after setting the temperature of the reactor on 25° C., 9.14 g (0.0286 mole) of 2,2'-bis(trifluoromethyl)benzidine (TFDB) is added, while maintaining the temperature at 25 C. To the solution, 6.3 g (0.0214 mole) of BPDA, and 1.55 g (0.0071 mole) of PMDA are added, and the resulting mixture is agitated for 48 hours to obtain a polyamic acid solution (solid content of 17 weight %).

Upon completion of the reaction, the resulting solution is coated on a glass substrate and spin casted, dried on a hot plate of 100° C. for 20 minutes, introduced into a furnace for heat treatment from the room temperature to 300° C. for 30 minutes, and maintained at 300° C. for 1 hour. The coated layer is further heated to 400° C. for 10 minutes, maintained at 400° C. for 30 minutes, and slowly cooled and separated from the glass substrate to obtain a polyimide film (10 μm thickness).

Comparative Example 4

80.73 ml of N-methyl-2-pyrrolidone (NMP) is fed into a 250 mL round-bottomed flask equipped with an agitator, an inlet for $N_2$ gas, and a cooler, under $N_2$ atmosphere. Then, after setting the temperature of the reactor on 25° C., 8.85 g (0.0208 mole) of 2,2'-bis(trifluoromethyl)benzidine (TFDB) is added, while maintaining the temperature at 25° C. To the solution, 6.1 g (0.0235 mole) of BPDA, and 2.03 g (0.0069 mole) of a-BPDA are added, and the agitation is continued for 48 hours to obtain a polyamic acid solution (solid content of 17 weight %). To the polyamic acid solution, 5 ml of TEOS (tetraethylorthosilicate), which corresponds to 7.3 weight % of the solid content of the polyamic acid, 1.5 ml of water, and 3.5 ml of NMP are added and the resulting mixture is agitated for 24 hours to prepare silica sol.

Upon completion of the reaction, the resulting solution is coated on a glass substrate and spin casted, dried on a hot plate of 100° C. for 20 minutes, introduced into a furnace for heat treatment from the room temperature to 300° C. for 30 minutes, and maintained at 300° C. for 1 hour. The coated layer is further heated to 400° C. for 10 minutes, maintained at 400° C. for 30 minutes, and slowly cooled and separated from the glass substrate to obtain a polyimide-silica composite film (10 μm thickness).

Comparative Example 5

80.73 ml of N-methyl-2-pyrrolidone (NMP) is fed into a 250 mL round-bottomed flask equipped with an agitator, an inlet for $N_2$ gas, and a cooler under $N_2$ atmosphere. Then, after setting the temperature of the reactor on 25° C., 8.85 g (0.0208 mole) of 2,2'-bis(trifluoromethyl)benzidine (TFDB) is added, while maintaining the temperature at 25° C. To the solution, 6.1 g (0.0235 mole) of BPDA, and 2.03 g (0.0069 mole) of a-BPDA are added, and the resulting mixture is agitated for 48 hours to obtain a polyamic acid solution (solid content of 17 weight %). To the polyamic acid solution, 15 ml of TEOS (tetraethylorthosilicate), which corresponds to 19.2 weight % of the solid content of the polyamic acid, 5 ml of water, and 11 ml of NMP are added and the agitation is continued for 24 hours to prepare silica sol.

Upon completion of the reaction, the resulting solution is coated on a glass substrate and spin casted, dried on a hot plate of 100° C. for 20 minutes, introduced into a furnace for heat treatment from the room temperature to 300° C. for 30 minutes and maintained at 300° C. for 1 hour. The coated layer is further heated to 400° C. for 10 minutes, maintained at 400° C. for 30 minutes, and slowly cooled. An attempt to separate the film from the glass substrate failed, as the film is too brittle to be separated from the glass substrate.

Experiment Example 1: Evaluation of Optical Properties of Film

Optical properties of the films prepared according to Examples 1 to 4 and Comparative Examples 1 to 5 are measured and presented in Table 1 below. The optical properties are measured after being treated at 400° C. for 30 minutes.

In Table 1, the transmittance for light is measured by using "8452A Spectrophotometer" produced by Hewlett Packard at a wavelength ranging from 380 nanometers to 780 nanometers.

TABLE 1

| | a-BPDA (mol %) | TEOS (weight %) | Trans. @380~780 nm (%) | Trans. @430 nm (%) | YI |
|---|---|---|---|---|---|
| Example 1 | 25 | 13.7 | 88.1 | 81.9 | 4.7 |
| Example 2 | 30 | 13.7 | 88.2 | 80.8 | 5.5 |
| Example 3 | 35 | 13.7 | 88.8 | 81.4 | 4.9 |
| Example 4 | 40 | 13.7 | 88.7 | 81 | 5.7 |
| Comparative Example 1 | 25 | 0 | 88.7 | 76.6 | 8.3 |
| Comparative Example 2 | HPMDA 25 mole % | 0 | 72.3 | 18.3 | 49.6 |
| Comparative Example 3 | PMDA 25 mole % | 0 | whiteness | — | — |
| Comparative Example 4 | 25 | 7.3 | 87.4 | 78.3 | 7 |
| Comparative Example 5 | 25 | 19.2 | brittle | — | — |

As shown in Table 1, the polyimide-silica composite films prepared from the compositions including the precursor of silica according to Examples 1 to 4 exhibit higher transmittance for light at a wavelength ranging from 380 nm to 780 nm, and at wavelength of 430 nm, than the film prepared from the composition according to Comparative Example 1, which does not include the precursor of silica. The yellowness indexes of the films according to Examples 1 to 4 are lower than the film according to Comparative Example 1.

Meanwhile, the polyimide film according to Comparative Example 2, which includes 25 mole % of HPMDA (1,2,4,5-cyclohexane tetracarboxylic dianhydride) having a planar structure, instead of the a-BPDA having a tilted dihedral structure, exhibits lower transmittance for flight at a wavelength ranging from 380 nm to 780 nm, and at wavelength of 430 nm, than the films according to Examples 1 to 4. Further, the yellowness index of the film according to Comparative Example 2 is very high, i.e., 49.6, compared to the films according to Examples 1 to 4.

The polyimide film according to Comparative Example 3, which includes mole % of PMDA having a planar structure, instead of the a-BPDA having a tilted dihedral structure, exhibits whiteness, which makes it impossible to measure transmittance for flight and yellowness index.

The film prepared from the composition according to Comparative Example 4, which includes the precursor of silica in an amount of 7.3 wt % based on the solid content of the polyamic acid, exhibits lower transmittance for light at a wavelength ranging from 380 nm to 780 nm, and at wavelength of 430 nm, than the films according to Examples 1 to 4. Further, the yellowness index of the film according to Comparative Example 3 is rather high, i.e., 7, compared to the films according to Examples 1 to 4.

The film prepared from the composition according to Comparative Example 5, which includes the same polyamic acid as the composition according to Example 1, but includes the precursor of silica in an amount of 19.2 wt % based on the solid content of the polyamic acid, is too brittle to form a film.

Experiment Example 2: Evaluation of Thermal Properties of Films

Thermal properties of the films prepared from Examples 1 to 4 are measured and presented in Table 2 below.

The glass transition temperature ($T_g$) is measured by using TA Instruments 2980 dynamic mechanical analyzer, employing the collection frequency of 1.0 Hertz (Hz), pre-load weight of 0.05 Newtons (N), and heating rate of 5 degrees Centigrade per minute (° C./minute). The $T_g$ value is determined as the tan δ response peak.

The coefficient of thermal expansion (CTE) is measured by using "TMA 2940 thermal mechanical analyzer" produced by TA Instruments. CTE is measured at the second scan at the temperature range from 50° C. to 400° C. The expansion rate is then obtained by dividing by the temperature difference to have the units of parts per million per ° C. (ppm/° C.). In the first scan, shrinkage of the film and water in the film are eliminated, and in the second scan the CTE is measured as the film's essential property. In this case, 0.05 N of fixed tension is employed, and heating rate is 10° C./min.

The TGA (thermal gravity analysis) is measured for the weight losses of the samples of 10 mg to 15 mg after being isothermally treated at 400° C. for 4 hours in Pt heated from 25° C. to 600° C. at heating ratio of 10° C./min by using TGA Q500 (TA Instruments, USA) under $N_2$ atmosphere (gas flowing rate: 70 mL/min).

TABLE 2

| | a-BPDA (mol %) | Tg (° C.) | CTE (ppm/° C.) 50° C.~400° C. | WL@400° C., 4 hr (%) |
|---|---|---|---|---|
| Example 1 | 25 | 373 | 127 | 0.43 |
| Example 2 | 30 | 372 | 102 | 0.38 |
| Example 3 | 35 | 370 | 103 | 0.41 |
| Example 4 | 40 | 374 | 137 | 0.41 |

As shown from Table 2, the polyimide-silica composite films prepared from the compositions according to Examples 1 to 4 exhibit high glass transition temperatures ($T_g$) of greater than or equal to 370° C., and low CTE values of less than 150 ppm/° C. in the range of 50° C. to 400° C. Further, the weight loss of the films after being treated at 400° C. for 4 hours is less than 0.5 weight %, which is substantially low.

Accordingly, the polyimide-silica composite films according to the Examples have excellent thermal stability at a high temperature.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition for preparing a polyimide-inorganic particle composite comprising:
    a reaction product of a tetracarboxylic dianhydride mixture and a diamine, and
    a precursor of an inorganic particle,
    wherein the precursor of an inorganic particle is selected from an alkoxide, ester, acetylacetonate, halide, or nitride of Si,
    wherein an amount of the precursor of an inorganic particle is about 8 percent by weight to about 18 percent by weight based on the weight of the reaction product of a tetracarboxylic dianhydride mixture and a diamine,
    wherein the tetracarboxylic dianhydride mixture comprises a tetracarboxylic dianhydride represented by Chemical Formula 5, and a tetracarboxylic dianhydride represented by Chemical Formula 7, and
    wherein the diamine comprises 2,2'-bis(trifluoromethyl)benzidine:

Chemical Formula 5

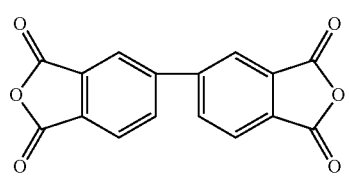

Chemical Formula 7

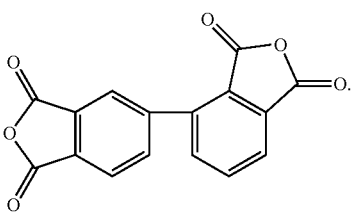

2. The composition according to claim 1, wherein the precursor of the inorganic particle is a precursor of $SiO_2$.

3. The composition according to claim 1, further comprising about percent by weight to about 50 percent by weight of water based on the weight of the precursor of an inorganic particle.

4. The composition according to claim 1, wherein an amount of the dianhydride represented by Chemical Formula 7 is greater than or equal to about 10 mole percent and less than about 53 mole percent, based on 100 mole percent of the dianhydride mixture.

5. The composition according to claim 1, wherein an amount of the dianhydride represented by Chemical Formula 7 is greater than or equal to about 25 mole percent and less than or equal to about 52 mole percent, based on 100 mole percent of the dianhydride mixture.

6. A polyimide-inorganic particle composite prepared from the composition according to claim 1,
    wherein the polyimide is represented by Chemical Formula 8:

Chemical Formula 8

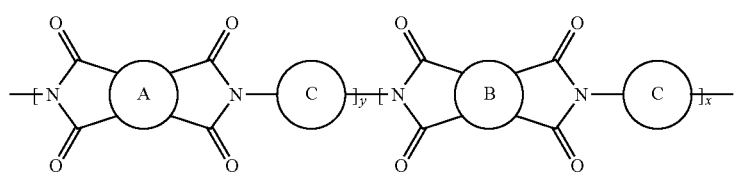

wherein in Chemical Formula 8,
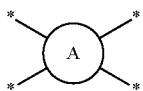
is represented by Chemical Formula 15,
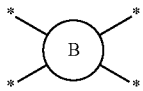
is represented by Chemical Formula 16, and
is represented by Chemical Formula 17;
Chemical Formula 15
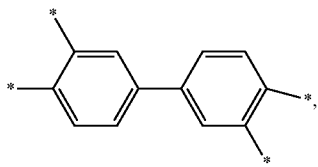
Chemical Formula 16
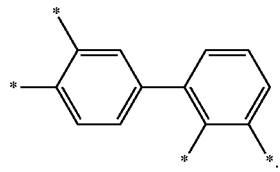
Chemical Formula 17
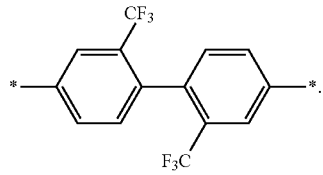
and
x is 0.10≤x<0.53, provided that x+y=1.
7. An article comprising the polyimide-inorganic particle composite according to claim 6.
* * * * *